March 30, 1965                C. A. RAMSEL                3,175,664
                    SEPARATORS FOR CLUTCH DISCS
                       Filed Nov. 2, 1962
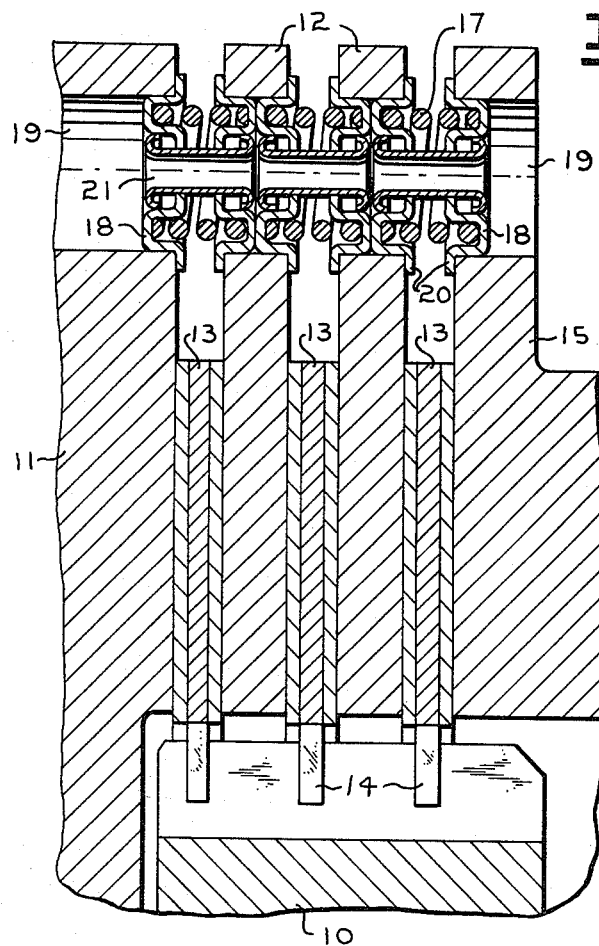
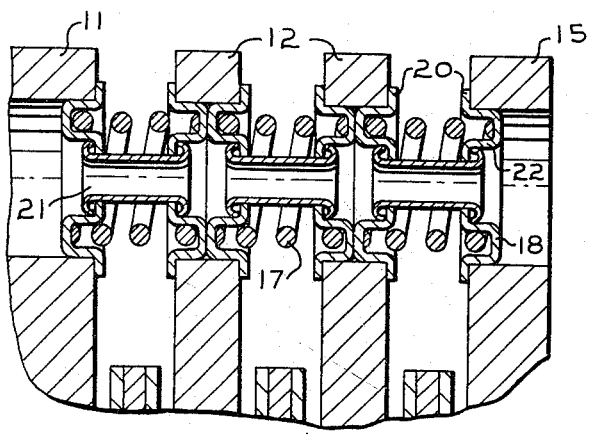
INVENTOR.
CHARLES A. RAMSEL
BY
ATTORNEYS 3,175,664
SEPARATORS FOR CLUTCH DISCS
Charles A. Ramsel, Peoria, Ill., assignor to Caterpillar Tractor Co., Peoria, Ill., a corporation of California
Filed Nov. 2, 1962, Ser. No. 234,974
1 Claim. (Cl. 192—69)

This invention relates to clutch disc separators and more particularly to resilient means arranged between the discs of clutches to effect positive separation thereof when the clutch is disengaged.

Various devices have been suggested and used for effecting positive separation of clutch discs particularly for wet plate clutches in which the discs or plates are bathed in oil and tend to remain in contact with each other creating unnecessary and undesirable friction or drag when the clutch is in its disengaged state. One such device is shown, for example, in my assignee's patent to J. M. Davies et al., No. 2,523,501.

It is the object of the present invention to provide a clutch disc separating device acting between driven discs of a clutch to separate them equally and positively upon disengagement of the clutch.

A further object of the invention is to provide a device of simple and low-cost construction with all of the parts necessary for use between any two discs preassembled in an easily handled and easily installed group.

Further and more specific objects and advantages of the invention and the manner in which it is carried into practice are made apparent in the following specification by reference to the accompanying drawing.

In the drawing:

FIG. 1 is a fragmentary sectional view showing one-half of a set of clutch discs and the separating means of the present invention associated therewith with the clutch in its engaged position; and FIG. 2 is a view similar to FIG. 1 showing the positions of the parts with the clutch disengaged.

Referring first to FIG. 1, a conventional clutch is illustrated as having a rotatable driving member 10 arranged to engage or disengage a driven member 11 through a clutch assembly which comprises clutch driven discs 12 arranged between driving discs 13 keyed to the splined periphery of the driving member as shown at 14 to be driven thereby. A pressure plate 15 which, in fluid actuated clutches, may be one face of a piston is adapted to be urged in a leftward direction as viewed in FIG. 1 to impart sufficient pressure to the driving discs and alternately arranged driven discs to impart driving engagement therebetween and thus to establish a driving connection between the driving member 10 and the driven member 11. Upon release or retraction of the pressure plate, separation is permitted between the driving discs and driven discs, all in a well known manner to effect disengagement of the clutch.

It is to means for insuring this separation and particularly to means for insuring equal and positive separation of the driven discs with respect to each other and with respect to the driven member and pressure plate that the present invention is directed. Such means comprise springs, shown as coil springs 17, one between each pair of elements to be separated. These springs are seated at their opposite ends in cups 18 received in aligned openings 19 in the driven member, driven discs and pressure plate. Each cup is peripherally flanged as at 20 to provide a stop at the outer edge of the opening in which it is received and each pair of cups is connected together by a centrally disposed rivet or other connecting means 21, here shown as a hollow rivet extending through suitable centrally disposed holes in the cups and having its ends flanged to limit the distance that a pair of cups may be separated by the force of a spring 17 and to hold the spring under a compressive pre-load.

The cups are preferably formed with an outwardly projecting portion 22 disposed concentrically of their inner walls leaving an annular groove in which the springs may seat and providing space between the inner walls of abutting cups for reception of the swaged ends of the rivets 21.

Each pair of cups with its associated spring and rivet is a preassembled package which is easily arranged in its proper position between the members to be separated as a unit. The springs act, as illustrated in FIG. 2, to effect positive and equal separation of the compressible stack, which includes the driven discs, the driven member and the pressure plate, when clutch engaging pressure is released. On application of clutch engaging pressure, the springs are compressed to the position illustrated in FIG. 1.

I claim:

In a clutch comprising alternately arranged sets of driving and driven discs forming a stack which may be compressed into frictional driving engagement, means to effect separation of the discs upon clutch disengagement which comprises, one set of said discs having aligned openings formed therein, pairs of cups disposed in said openings, a coil spring under compression between each pair of cups, a peripheral flange on each cup engaging the discs adjacent the openings, a rivet passing through centrally disposed holes in the inner walls of the cups, said rivets having enlarged ends and the inner walls of the cups being formed to provide recesses for the reception of said enlarged ends.

References Cited by the Examiner
UNITED STATES PATENTS
2,057,876  10/36  Berry _____ 192—69 X
FOREIGN PATENTS
487,136  11/53  Italy.

DAVID J. WILLIAMOWSKY, Primary Examiner.
ROBERT C. RIORDON, Examiner.